United States Patent [19]

Trattner et al.

[11] 4,065,956

[45] Jan. 3, 1978

[54] VARIABLE LOAD, HIGH VACUUM SHAFT BEARING TEST APPARATUS

[75] Inventors: Hermann Trattner, Munich; Kuno Saatze, Emmering; Adolf Bauereiss, Munich, all of Germany

[73] Assignee: Siemens Aktiengesellschaft, Berlin & Munich, Germany

[21] Appl. No.: 681,725

[22] Filed: Apr. 29, 1976

[30] Foreign Application Priority Data

May 9, 1975 Germany .............................. 2520719

[51] Int. Cl.² .......................................... G01M 13/04
[52] U.S. Cl. ............................................... 73/9
[58] Field of Search ............................... 73/7, 9, 15.6

[56] References Cited

U.S. PATENT DOCUMENTS

| | | | |
|---|---|---|---|
| 2,539,578 | 1/1951 | Headley | 73/9 |
| 2,867,113 | 1/1959 | Mims | 73/9 |
| 3,010,307 | 11/1961 | Schwegler | 73/15.6 |
| 3,178,928 | 4/1965 | Howe | 73/9 |
| 3,225,587 | 12/1965 | Gordon | 73/9 |
| 3,375,699 | 4/1968 | Lindeman | 73/10 |
| 3,469,437 | 9/1969 | Reece | 73/15.6 |
| 3,685,342 | 8/1972 | Gordon | 73/9 |
| 3,939,690 | 2/1976 | Kuss | 73/9 |

OTHER PUBLICATIONS

Harris "Lubricant's for Space" in Mechanical Engineering, 4/70, pp. 24-29.

*Primary Examiner*—Herbert Goldstein
*Attorney, Agent, or Firm*—Hill, Gross, Simpson, Van Santen, Steadman, Chiara & Simpson

[57] ABSTRACT

An apparatus has a rotatable shaft driven within a vacuum chamber through a magnetic clutch. A mounting block is carried on a test bearing adjacent one end of the shaft and is restricted from rotating with the shaft by a friction torque measuring device engaged therewith. The block is subjected to axial and radial loads which are adjustably variable during testing by control devices located outside the vacuum chamber and connected to the mounting block by traction linkages passing through seals in the chamber walls. The test bearing is heated inductively; cooling discs and a reservoir are provided on and adjacent the shaft. Vibration measuring and visual observation devices are also disclosed.

3 Claims, 5 Drawing Figures

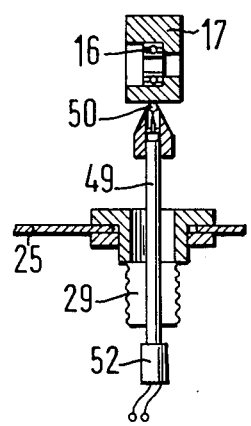
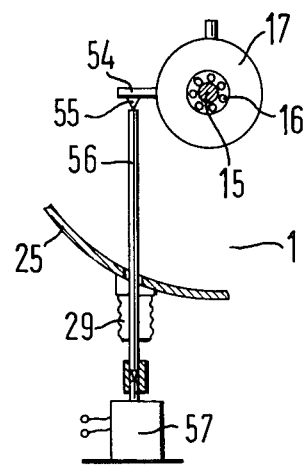
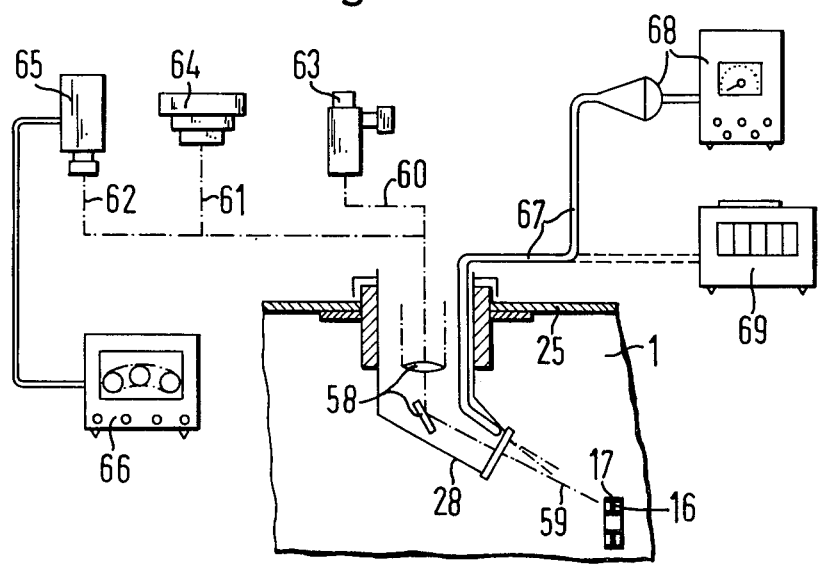

VARIABLE LOAD, HIGH VACUUM SHAFT BEARING TEST APPARATUS

BACKGROUND OF THE INVENTION

1. Field of the Invention

The present invention relates to devices for testing shaft bearings in a high vacuum chamber.

2. The Prior Art

Bearings must withstand high thermal loadings and operate under high vacuum conditions in various applications.

It is well known to test materials and devices of the most varied kinds under such "environmental conditions". It is known to operate ball bearings under load in high vacuum chambers in a pressure range extending from $10^{-3}$ to $10^{-11}$ mm.Hg. Cooling of the high vacuum chambers is carried out using liquid nitrogen or helium.

One known device for testing shaft bearings consists of a substantially cuboid high vacuum chamber in which a shaft carrying the test bearing is rotatably assembled and driven by an electric motor with a field winding arranged outside the chamber. A heating system for the test bearing is provided. An axial load may be applied to the test bearing by a test load arranged inside the high vacuum chamber. The chamber is equipped with an inspection glass for observation therethrough of the test bearing during testing.

In such known high vacuum chambers, test loads cannot be varied during the test. Also, the test bearing cannot be radially loaded.

For proper testing of a bearing, it is necessary for both radial and axial loads to be variable in magnitude during the conduct of the test; also, the smoothness of running of the bearing during test operation must be observable and recordable. If the bearing is to be run while subject to a thermal load, bearing heat must be dissipated from the high vacuum chamber.

SUMMARY OF THE INVENTION

One object of the present invention is to provide a high vacuum chamber for the testing of shaft bearings, in which during testing arbitrary test loads may be applied to the bearing. It is also intended that means be provided for the dissipation of bearing heat from the chamber. In accordance with the invention, the test bearing is surrounded by a mounting block engaged by a measuring adaptor to determine the friction torque and radially and axially loadable tractive elements for applying loads to the test bearing. All the loads applied to the test bearing are adjustable by means of control elements disposed outside the high-vacuum chamber.

Through this design of the device for testing shaft bearings, in accordance with the invention, it becomes possible during testing to apply changing loads to the shaft bearing. The journal of the shaft carrying the test bearing can be heated preferably by induction heating techniques. The temperature of the test bearing can be measured, controlled and adjusted by means of a radiation metering unit disposed outside the high vacuum chamber. The shaft is provided with radial cooling fins and between these are disposed fixed cooling jaws connected to a liquid cooler. Radiated heat from the cooling fins is transferred directly to the cooling jaws which pick up a major part of the radiated heat which is then dissipated through the cooler. The shaft itself is at least partially coolable; preferably, the shaft support bearings will be coolable. The high vacuum vessel will be provided with at least one window comprising an optical system whose optical axis is directed onto the test bearing. Furthermore, the test bearing may be illuminated by light flashes from a stroboscope located outside the high vacuum chamber. To this end, the chamber may be equipped with a separate window, however, it is an advantage to use an optical conductor system to direct the light flashes through the viewing optical system onto the test bearing.

BRIEF DESCRIPTION OF THE DRAWINGS

FIG. 3 is a side sectional view through a vibration detector apparatus of the present invention.

FIG. 4 is an endwise, sectional view of the friction torque measurement apparatus.

FIG. 5 is a side, sectional view, partly schematic, of the observation apparatus of the present invention.

BRIEF DESCRIPTION OF THE PREFERRED EMBODIMENTS

Figure 1:
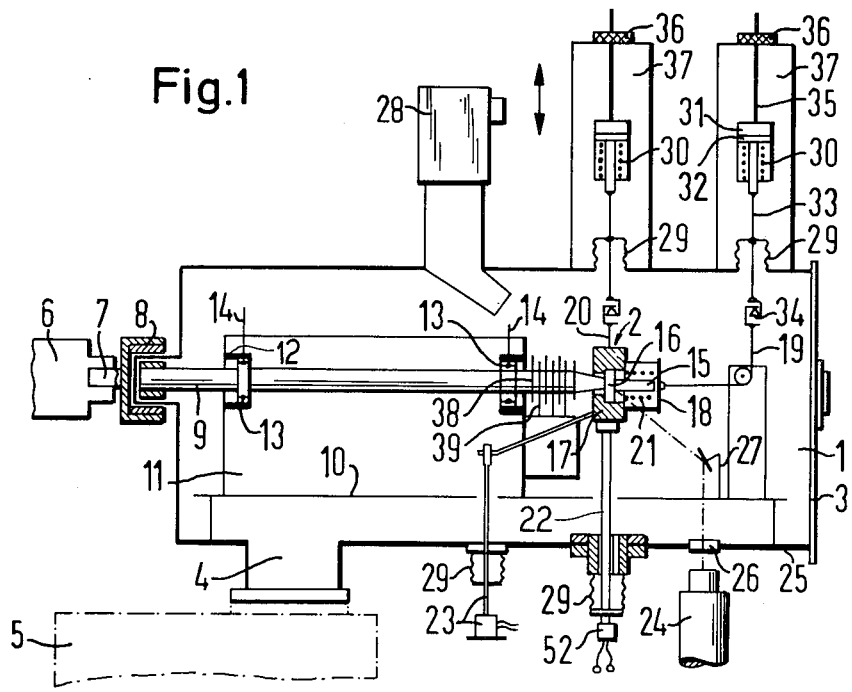
FIG. 1 is a mostly schematic side elevational view of an apparatus employing the present invention.

In FIG. 1 a high vacuum chamber 1 consists of a substantially cylindrical housing enclosing a testing station 2. The chamber 1 is closed by a cover 3, and communicates through a connection 4 to a high vacuum generator device 5. A coupling drive stub 6 driven by an electric motor is connected through a coupling 7 with a magnetic clutch 8. Under the influence of the magnetic field of the clutch 8, a rotor shaft 9 is set into rotation within the high vacuum chamber. Inside the chamber is a support box 10, which in the interior 11 thereof a bearing block 12 is arranged to carry support bearings 13 for the shaft 9. The shaft 9 is tapered at a forward end 15 and carries a test bearing 16 at that location.

A mounting block 17 surrounds and is carried by the test bearing 16. Connected to the mounting block 17 is a cage 18 to which a cable 19 is attached. The load of the cable 19 applies an axial force to the bearing 16. A further tractive cable 20 engages the mounting 17 radially to apply radial forces to the bearing 16.

In the case 18, a high frequency coil 21 is arranged and connected to a high frequency generator (not shown). Inductive heating of the bearing stub 15 heats the bearing 16.

Also bearing upon the mounting 17 is a vibration detector 22 and a measuring probe 23 which determines the friction torque of the bearing 16, by measuring the force necessary to prevent the block 17 from rotating.

The temperature of the bearing 16 is detected by a radiation metering unit 24. Temperature control and regulating facilities for the test bearing 16 and the chamber 1 generally comprise known elements. In the wall 25 of the high vacuum chamber 1 is a window 26. Thermal radiation from the bearing is directed through the window 26 by a mirror 27 to the radiation metering unit 24 outside the chamber. An observation device 28 extends through the wall 25 of the high vacuum chamber and is used to observe visually and photographically the bearing behavior during testing.

The two tractive elements 19, 20 extend to the exterior of the chamber 1 through sleeve and bellows seals 29. Their ends attach to control elements 30. Each control element 30 consists of a cylinder 31 with a spring-loaded piston 32 arranged therein, which is connected through a draw bar 33, a point-contact joint arrangement 34 and to the particular tractive element engaging the mounting block 17. The cylinder 31 is arranged in a protective housing 37; it carries a threaded spindle 35 with a knurled nut 36. The knurled nut bears against a cover 37' of a protective casing 37 thereabout. Turning the knurled nut 36 varies load applied to the mounting 17 and therefore to the test bearing 16.

The shaft 9, in the neighborhood of the test device 2, carries discs or fins 38; between the fins 38 extend cooling jaws 39 which embrace the shaft 9 in U-fashion. Heating the shaft stub 15 by the induction coil 21, and thereby thermally loading the test bearing 16 heats the shaft 9. The fins 38 consequently heat up as well; heat radiated from the fins is absorbed in the jaws 39. The jaws 39 are connected to a housing 40 in which is eatablished a flow of cooling water.

Figure 2:
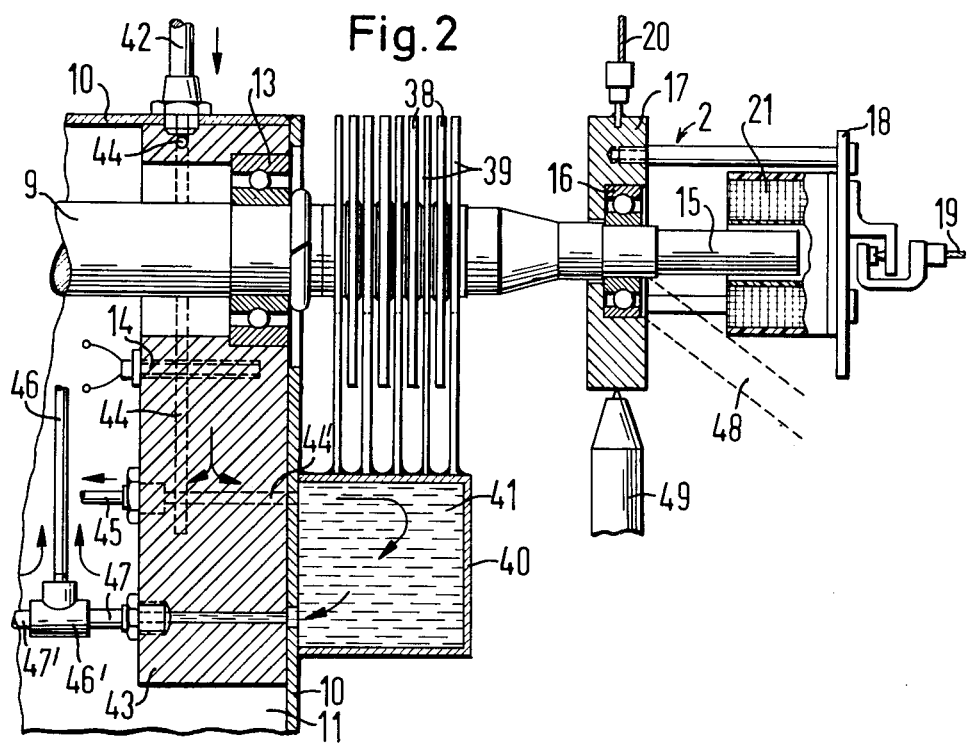
FIG. 2 is a detail, side sectional view of the apparatus of the invention near the test head.

As shown in the embodiment of FIG. 2, cooling water 41 is directed through a connection 42 in the direction of the arrow, via a bearing block 43 carrying the shaft bearing 13. The cooling passages 44 contained in the bearing block carry heat away from the bearings 13. Through the passage 44', the cooling water flows on the one hand into the cooler 40 carrying the cooling jaws 39, and on the other hand via the line 45 to the opposite shaft bearing adjacent the drive clutch 8. The cooling water returns via the line 46 which is connected by a Teepiece 46' to the return line 47 and 47'. A thermocouple 14 monitors temperature in the bearing block 43 adjacent each bearing 13.

The test bearing assembled in the mounting block 17 is observed through a gap 48 between the frequency coil 21 and the cage 18, which serves as a measuring interval across which radiated heat propagates to the radiation metering unit 24 (FIG. 1).

A sensing adaptor 49 (in FIG. 3) lightly engages the mounting 17; it monitors vibrations in the bearing during testing. An adaptor head 50 carries a ball 51 which acts on a piezo-electric crystal. The voltage across the crysal is picked off at 52 outside the housing wall 25 of the high vacuum chamber 1. The tube 49 carrying the adaptor head extends through a bellows seal 29.

FIG. 4 illustrates the arrangement of a test adaptor 53 for measuring the friction torque of the bearing 16 during testing. The mounting block 17 has a radially extending flange 54 with a point 55 which bears against a force-measuring device assembled in a tube 56. The tube 56 passes through the wall 25 of the high vacuum chamber 1 and is sealed by bellows seal 29. An amplifier 57 supplies the measured forces to a recording and pickup unit.

FIG. 5 illustrates the observation tube 28 which passes through the wall 25 of the high vacuum chamber 1 with its optical system and deflecting mirror 58 shown schematically. An optical axis 59 of the observation tube points towards the mounting block 17 and the test bearing 16. As indicated in broken line at 60 to 62, the optical system is disposed so that the test bearing may be viewed through an eye-piece 63 and also photographed by camera 64. The behavour of the bearing can also be shown on a monitor 66 during testing, by means of a vidicon 65.

Into the observation tube 28 projects an optical fiber bunch 67 for selective connection on one hand to a stroboscope 68 and on another to a continuous light source 69. The light source 69 is used to continuously and uniformly illuminate the viewing space, while the stroboscope is employed for high-speed periodic observations.

Although various minor modifications may be suggested by those versed in the art, it should be understood that we wish to embody within the scope of the patent warranted hereon all such modifications as reasonably and properly come within the scope of our contribution to the art.

We claim as our invention:

1. An apparatus for testing a shaft bearing under high vacuum and variable loads, comprising:
   a high vacuum chamber having peripheral walls;
   a rotatable shaft carried on fixed, spaced-apart shaft support bearings within said chamber and having a magnetic clutch on one end thereof coupled through said wall of said chamber to a drive means, said shaft having a test end opposite said clutch end upon which is mounted said test bearing;
   a test bearing mounting block carried circumjacent said test end of said shaft upon said test bearing;
   a bearing friction torque measuring means in said chamber engaging said mounting block and restraining said block from rotational mvoement;
   a tractive means for applying a load to said mounting block axially of said shaft, said tractive means extending through said vacuum chamber wall at a vacuum seal and to a load control means outside said chamber for varying said axial load on said test bearing;
   the test end of the shaft extending in a stub axially beyond said test bearing opposite said fixed bearings; and
   an induction coil spaced radially about the shaft stub, whereby the stub and test bearing may be heated.

2. The apparatus defined in claim 1, further comprising:
   a cooling means upon said shaft between said test bearing and said shaft support bearing;
   a radiation metering unit optically communicating to said test bearing through said chamber wall; and
   temperature control means regulating at least one of current flow through said induction coil and cooling of said shaft to maintain a desired temperature in the test bearing.

3. The apparatus defined in claim 2, wherein said shaft cooling means comprise a plurality of radially-extending axially-spaced fins affixed to said shaft and a plurality of jaw plates spaced axially among said fins, the jaw plates contacting a cooling reservoir in said housing.

* * * * *